(12) United States Patent
Goodman

(10) Patent No.: US 7,027,833 B1
(45) Date of Patent: Apr. 11, 2006

(54) DUAL BAND SUPERHETERODYNE RECEIVER

(75) Inventor: Daniel J. Goodman, Dunkirk, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 56 days.

(21) Appl. No.: 10/817,416

(22) Filed: Apr. 2, 2004

Related U.S. Application Data

(60) Provisional application No. 60/514,596, filed on Oct. 20, 2003, provisional application No. 60/459,651, filed on Apr. 3, 2003.

(51) Int. Cl.
*H04M 1/00* (2006.01)
*H04B 1/26* (2006.01)
*H04B 1/40* (2006.01)

(52) U.S. Cl. .............................. 455/553.1; 455/552.1; 455/318; 455/323; 455/90.2; 455/76; 455/86

(58) Field of Classification Search ................ 455/550, 455/553.1, 90.2, 86, 180.1, 188.1, 189.1, 455/190.1, 260, 308, 313, 318, 319, 152.1, 455/75, 76, 85, 230, 552.1, 323; 375/316, 375/324, 344
See application file for complete search history.

(56) References Cited

U.S. PATENT DOCUMENTS

| | | | |
|---|---|---|---|
| 4,214,212 A * | 7/1980 | Dipietromaria | 455/190.1 |
| 4,215,313 A | 7/1980 | Chang et al. | |
| 4,313,216 A * | 1/1982 | Jaeger et al. | 455/226.1 |
| 4,412,354 A | 10/1983 | Hu | |
| 4,626,857 A | 12/1986 | Imazeki | |
| 4,668,952 A | 5/1987 | Imazeki | |
| 4,726,072 A | 2/1988 | Yamashita et al. | |
| 5,014,349 A * | 5/1991 | Kubo et al. | 455/189.1 |
| 5,437,051 A * | 7/1995 | Oto | 455/3.02 |
| 5,530,927 A | 6/1996 | Smith | |
| 5,548,839 A * | 8/1996 | Caldwell et al. | 455/313 |
| 5,661,485 A | 8/1997 | Manuel | |
| 5,697,089 A | 12/1997 | Lundqvist et al. | |
| 5,726,657 A | 3/1998 | Pergande et al. | |
| 5,847,612 A * | 12/1998 | Birleson | 331/2 |

(Continued)

OTHER PUBLICATIONS

Tsui, J. B-Y., Microwave Receivers with Electronic Warfare Applications, pp. 134-181, (1992).

(Continued)

*Primary Examiner*—Duc M. Nguyen
(74) *Attorney, Agent, or Firm*—John J. Karasek; Sally A. Ferrett

(57) ABSTRACT

A MMIC based superheterodyne receiver for converting at RF energy in an upper and a lower frequency band includes at least one attenuator for the RF energy input, a mixer for mixing the lower band input with a LO1 signal, another mixer for mixing the upper band input with the LO1 signal signal, a switch to direct the LO1 signal to the first mixer or to the second mixer, and a third mixer for mixing a LO2 signal with the first stage mixer output to produce a signal at the output frequency. Passband filters at the outputs of the mixers can reject interfering mixer-generated frequencies. Input frequency range can span 0.1 to 18 GHz with a 160 MHz or 1 GHz output. A modular receiver can have two or more converter modules for each LO module. The receiver can receive antenna input directly, without pre-mixing filtering or attenuating.

58 Claims, 7 Drawing Sheets

U.S. PATENT DOCUMENTS

| | | |
|---|---|---|
| 5,852,417 A | 12/1998 | Valentine et al. |
| 5,852,784 A * | 12/1998 | Ito et al. .................. 455/552.1 |
| 5,856,801 A | 1/1999 | Valentine et al. |
| 5,875,389 A * | 2/1999 | Yokoyama .................. 455/203 |
| 5,900,832 A | 5/1999 | Valentine et al. |
| 6,029,054 A | 2/2000 | Lemley |
| 6,057,876 A * | 5/2000 | Waight ....................... 725/151 |
| 6,072,994 A | 6/2000 | Phillips et al. |
| 6,072,996 A * | 6/2000 | Smith ....................... 455/189.1 |
| 6,088,348 A * | 7/2000 | Bell et al. .................... 370/343 |
| 6,100,841 A | 8/2000 | Toth et al. |
| 6,127,962 A | 10/2000 | Martinson |
| 6,133,795 A | 10/2000 | Williams |
| 6,169,410 B1 | 1/2001 | Grace et al. |
| 6,169,511 B1 | 1/2001 | Iwakuni et al. |
| 6,175,324 B1 | 1/2001 | Valentine et al. |
| 6,211,815 B1 | 4/2001 | Richery et al. |
| 6,345,176 B1 * | 2/2002 | Mattisson ................... 455/296 |
| 6,377,315 B1 | 4/2002 | Carr et al. |
| 6,400,305 B1 | 6/2002 | Kuhn |
| 6,449,264 B1 * | 9/2002 | Lehtinen et al. ............ 370/328 |
| 6,507,308 B1 | 1/2003 | Ono et al. |
| 6,549,766 B1 | 4/2003 | Vorenkamp et al. |
| 6,590,468 B1 | 7/2003 | du Toit et al. |
| 6,591,091 B1 | 7/2003 | Vorenkamp et al. |
| 2003/0090436 A1 | 5/2003 | Schantz et al. |
| 2003/0147480 A1 | 8/2003 | Richards et al. |
| 2003/0161411 A1 | 8/2003 | McCorkle et al. |
| 2003/0232612 A1 | 12/2003 | Richards et al. |

OTHER PUBLICATIONS

Malmqvist,R., Gustafsson, A., Danestig, M., Ouacha, A., Hagelin, S., Rudner, S., Analysis of Tunable Narrow-band Recursive Active MMIC Filters for Future Adaptive In-Chip Radar Receivers., Microwave Conference, 2000 Asia Pacific, Dec. 3-6, 2000, pp. 1073-1076.

Malmqvist,R., Gustafsson, A., Alfredsson, M., Ouacha, A., A Tunable Active MMIC Filter for On-Chip X-Band Radar Receiver Front-Ends, Microwave Symposium Digest, 2002 IEEE Mtt-S International, vol. 3, Jun. 2-7, 2002, pp. 1907-1910.

* cited by examiner

DUAL BAND SUPERHETERODYNE RECEIVER

CROSS REFERENCE TO RELATED APPLICATIONS

This application claims the benefit of U.S. Provisional Application No. 60/514,596, filed on Oct. 20, 2003 and the benefit of U.S. Provisional Application No. 60/459,651, filed on Apr. 3, 2003, the disclosures of each of which are incorporated by reference in their entireties.

FIELD OF THE INVENTION

This invention relates in general to a receiver for receiving electromagnetic energy over a wide frequency band and converting the energy to an intermediate frequency.

BACKGROUND

Radar systems use a wide variety of frequencies and signal shapes. In many environments, it is desired to be able to determine that a radar source is operational, and to identify the type of radar system which is transmitting energy into the environment. For example, aircraft traveling in a region may wish to be able to identify the type of radar systems operational in an area.

Radar detectors have been produced which are tuned for a specific, relatively narrow energy band. Other radar detectors can receive signals at a few discrete frequencies. For example, U.S. Pat. No. 5,606,736 to Hasler et al. discloses a receiver for receiving signals from both GPS satellites and GLOSNASS satellite, each of which transmits at a different frequency.

Commonly assigned U.S. Pat. No. 6,029,054 to Lemley, the disclosure of which is incorporated by reference herein in its entirety, discloses a receiver that is suitable for receiving energy over a band of frequencies from 0.5 GHz to 18 GHz and converts the received frequency to an intermediate frequency of either 160 MHz or 400 MHz. Lemley discloses using image rejection mixers and filters at the input to reduce image problems. Attention is also drawn to an example of a superheterodyne receiver discussed in *Microwave Receivers with Electronic Warfare Applications*, James Bao-Yen Tsui, 1992, which discloses using filters before the first mixer stages to reduce image problems.

SUMMARY

One embodiment of a superheterodyne receiver suitable receiving RF energy in an upper frequency band and a lower frequency band and for translating the received RF energy to an output frequency includes a first input for receiving the RF energy, a second input for receiving the RF energy, and at least one attenuator for attenuating the RF energy received through the first input or the second input. The receiver also includes a first mixer arranged for mixing a first local oscillator signal with the RF energy in the lower frequency band to produce a signal at a first intermediate frequency, a second mixer arranged for mixing the first local oscillator signal with the RF energy in the upper frequency band to produce a signal at a second intermediate frequency, and a switch configured to direct the first local oscillator signal either to the first mixer or to the second mixer. The receiver also includes a third mixer for mixing a second local oscillator signal with the signal at the first intermediate frequency or the signal at the second intermediate frequency to produce a signal at the output frequency.

Other advantages and features of the invention will become apparent from the following detailed description of the preferred embodiments and the accompanying drawings.

BRIEF DESCRIPTION OF THE DRAWING FIGURES

The invention will now be described with reference to certain preferred embodiments thereof and the accompanying drawings.

DETAILED DESCRIPTION OF PREFERRED EMBODIMENTS

The receivers described herein are useful in electronic surveillance or intelligence systems that identify the type of radar transmitter based on the transmitted signal.

Superheterodyne receivers generally convert the incoming signal to a known output frequency, typically called an "intermediate frequency", for further processing by electronics optimized for that particular frequency. The following description uses "output frequency" to refer to the frequency of the output signal of the superheterodyne receiver, and "intermediate frequency" to refer to the frequency of the signal after the initial mixing stage and before the second mixing stage.

Figure 1:
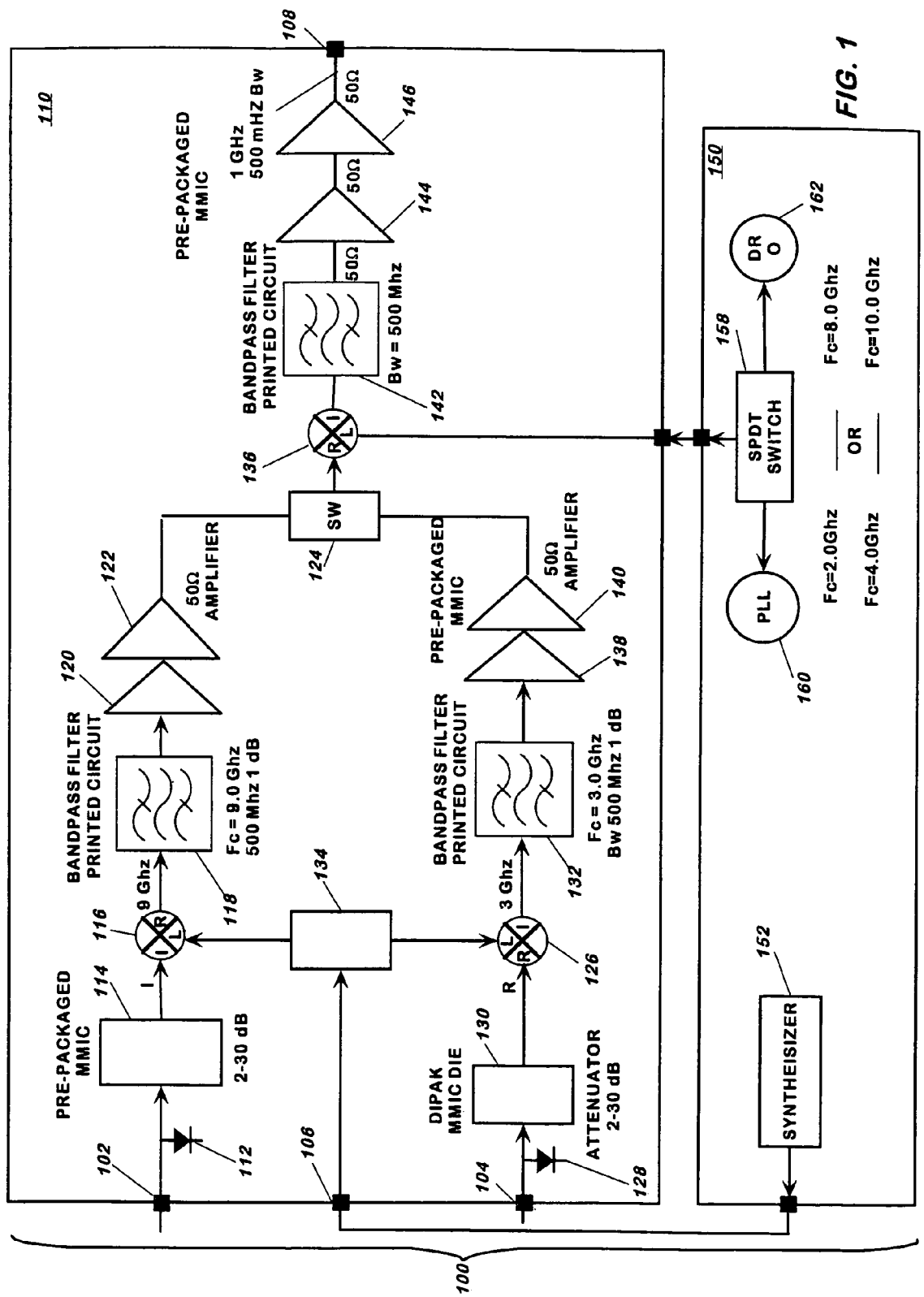
FIG. 1 is a schematic view of a receiver according to an embodiment of the invention.

FIG. 1 illustrates schematically a superheterodyne receiver 100 for receiving signals in a 0.1 to 18 GHz frequency range, and converting the signals to an output frequency of 1 GHz. Another version of the receiver, illustrated in FIGS. 5 and 6, converts the 0.1 to 18 GHz input signal to an output frequency of 160 MHz.

Most or all of the receiver components can be surface mount radio frequency semiconductor functional-elements, and the entire RF receiver can be incorporated on printed circuits and housed in small modules.

The receiver 100 is dual-band receiver, meaning it has components arranged to process an upper frequency band input and a lower frequency band input, although the receiver can also be adapted to process more than two frequency bands. The receiver 100 has two input connectors 102 and 104 for receiving signals intercepted with a low frequency antenna and a high frequency antenna, respectively. Alternatively, the input signal can be from a single antenna, and a splitter can be used to divide the signal into an upper and a lower frequency bands.

The receiver 100 performs conversion of a wide band of frequencies at low cost and in a simple, compact, lightweight receiver package. As will be discussed in later paragraphs, the wideband first-conversion approach of the receiver requires no pre-selection filtering of the input signals. In contrast, and as discussed in Tsui's *Microwave Receivers with Electronic Warfare Applications*, other superheterodyne receivers position a bandpass filter in front of the first stage mixer (between the antenna and the mixer).

In the embodiment illustrated in FIG. 1, the receiver 100 has a lower frequency range for incoming signals of 0.1 GHz (100 MHz) through at least 18 GHz, and an upper frequency input band (Band B) of 6 GHz to 18 GHz. The receiver 100 double converts the input signals in each of the bands to produce the output signal at the desired 1 GHz output frequency. The first-conversion of the incoming RF signal translates the input RF frequency-band to a first intermediate-frequency (IF) band. A local oscillator provides a local oscillator signal selected to produce the intermediate frequency at the output of the first mixer such that interfering frequencies will be outside the intermediate frequency band. A personal-computer based controller or other type of controller can vary the local oscillator frequencies to scan through the input range of frequencies.

The receiver 100 can be housed in two modules 110 and 150, where a converter module 110 contains the RF receiver components such as converters, filters, gain blocks, and attenuators, and a local oscillator module 150 contains the local oscillators used for frequency tuning. This allows the receiver 100 to be configured as a single or coherent multiple-channel RF receiver. For coherent processing, one local oscillator module 150 can provide signals to two or more converter modules 110, allowing the two converter modules to provide outputs which can then be coherently processed by follow-on electronics.

The local oscillator module 150 has a local oscillator 152 that provides the 9–15 GHz local oscillator signal to both the Band A mixer 116 and the Band B mixer 126. The local oscillator frequency is varied by a computer controller from 9.0 to 15 GHz. The local oscillator signal is switched between Bands A and B by a diode switch 134 in the converter module 110.

In the 1 GHz receiver 100, the converter module 110 includes components for first conversion of the input signals in the lower frequency band, Band A, components for first conversion of the input signals in the upper frequency band, Band B, and common components for the second mixing statge. The input signals are converted by the second mixer to a common 1 GHz output frequency. The 1 GHz output signal can then be transferred by an output connector 108 to a signal processor for analog to digital conversion or other processing.

As seen in FIG. 1, an RF signal within the 0.1 to 6 GHz range enters the Band A input 102. An RF limiter 112 protects the receiver from high RF overload by grounding it out, and an attenuator 114 reduces the RF signal amplitude. Preferably, the attenuator 114 is a pre-packaged MMIC attenuator with variable attenuation which can be set by the operator depending on the specific application (e.g., distance from possible radar transmitters, signal strength, etc.). In the FIG. 1 embodiment, the attenuator 114 provides variable attenuation ranging from 2 dB to 30 dB of attenuation.

After attenuation, the Band A RF signal enters the I Port of the first RF mixer 116. A signal from the first local oscillator (LO1) 152 within the 9.0 to 15.0 GHz range is injected into the L port of the mixer 116, and the RF Band A input signal is converted to an intermediate frequency (IF1) signal at 9 GHz. The Band A 9 GHz signal then passes from the R port of the mixer 116 through a bandpass filter 118 having a 500 MHz bandwidth, then through gain blocks 120 and 122 into a switch 124, which selectively forwards either this Band A 9 GHz signal or the Band B 3 GHz signal to the second mixing stage.

As seen in FIG. 1, the RF input signal (6–18 GHz) from a higher frequency antenna enters the module 110 through an input connector 104, after which it is amplitude limited by a RF limiter 128 to protect the module 110 from overload, and attenuated by the attenuator 130. This signal then enters the R Port of the RF Mixer 126, and the 9.0 to 15.0 GHz signal from the local oscillator 152 is injected into the L port of the mixer 126, producing an intermediate frequency (IF2) signal at 3 GHz at the I port of the mixer 126.

Once converted to 3 GHz, the Band B signal is passed through a printed circuit bandpass filter 132 having a bandwidth centered approximately at the 3 GHz intermediate frequency and having a 500 MHz bandwidth that is small enough to substantially block mixer spurs. Details of the mixing plan are discussed later paragraphs and illustrated in FIG. 2.

The pre-packaged MMIC switch 124 feeds either the 9 GHZ IF signal from Band A or the 3 GHz IF signal from Band B to the R Port of a second stage mixer 136. The mixer 136 downconverts the 3 GHz or 9 GHz input to a 1 GHz signal at its I port output by applying a second local oscillator signal to the L port of the mixer 136.

The receiver 100 can be set to provide either a 8.0 GHz or a 10 GHz local oscillator signal (LO2) to the downstream mixer 136 when the switch 124 directs the Band A 9 GHz signal to the mixer 136, depending on whether low side mixing or high side mixing is desired. Similarly, the receiver can be set to provide either a 2.0 or 4.0 GHz local oscillator signal to the second stage mixer 136 when the switch 124 directs the Band B 3 GHz signal to the mixer 136, depending on whether low side mixing or high side mixing is desired. A switch 158 is used to select the correct oscillator source and frequency for the mixer 136. The switch 158 can be, for example, a surface-mounted, MMIC, single pole double throw (SPDT) switch. A dielectric resonance oscillator (DRO) 162 can provide the 8.0 and 10.0 GHz signal and a phase-locked loop synthesizer 160 can provide the 2.0 or 4.0 GHz signal, although other alternative sources can be used.

The 1 GHz output signal from the downstream mixer 136 of FIG. 1 is then fed into a bandpass filter 142 that preferably has a 1 dB bandwidth of about 500 MHz and is centered on 1 GHz. The filtered signal then drives two cascaded prepackaged MMIC gain blocks 144 and 146 before it reaches the output connector 108 of the converter module 110. Optionally, the bandpass filter 142 and gain blocks 144 and 146 can be eliminated or the output signal can be filtered and amplified by a follow-on processor (not shown).

Thus, as seen in FIG. 1, the same mixer 136 accomplishes the second mixing step for both the lower frequency band and the upper band. Further, the same local oscillator 152 provides the same local oscillator frequency in the range of 9–15 GHz to the first mixing stage mixers 116 and 126 for both the 6–18 GHZ upper input frequency band and the 0.1 to 6 GHz lower frequency band.

The gain blocks 120 and 122, as well as the other gain blocks in the receiver 100, are preferably prepackaged MMIC gain blocks. Fixed-bias resistors (not shown) that feed a DC voltage to the gain blocks can be varied to adjust the overall receiver gain. For the FIG. 1 receiver 100, the Band B 30 dB MMIC attenuator 130 is not presently commercially to be available in a pre-packaged form. Therefore, the 30 dB MMIC attenuator is pre-mounted and wire bonded in a DiPak carrier. All the MMICs other than the Band B MMIC attenuator 130 are available pre-packaged.

An advantage of including the attenuator 114 before the first mixer 106 is that the attenuator increases the dynamic range control of the receiver 200 without the use of high dynamic-range conversion components. For example, the receiver in FIG. 1 has a 30 dB instantaneous dynamic range and a 60 dB to 70 dB total dynamic range.

The bandpass filters can be selected to provide a desired amount of group delay. For example, the filter 142 of the FIG. 1 receiver has a bandwidth of 500 MHz, because the group delay is not critical to an application for this receiver. In some situations, however, the group delay is desired to be very small. Thus, the receiver filters can be selected to provide a very small group delay, for example, less than 2 nanoseconds or less than 4 nanoseconds.

Although the input frequency bands are broad (0.1 to 6 GHz and 6 to 18 GHz), the receiver 100 does not require a bandpass filter or amplifier positioned before either of the first mixers 116 and 126 to prevent image frequencies from generating outputs in the mixers. This is the result of the spectrum inversion mixing plan discussed in the following paragraphs and illustrated in FIGS. 2A–2D.

Figure 2A:
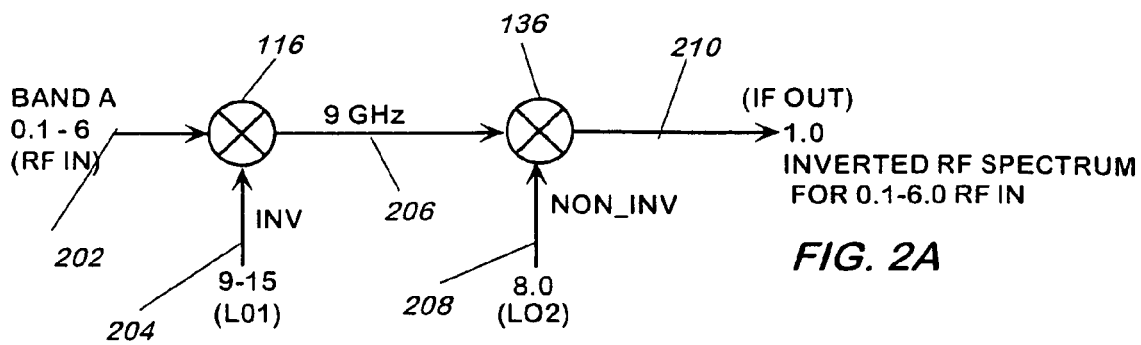
FIG. 2 illustrates a mixing profile for the receiver of FIG. 1.

As seen in FIG. 2A, the first mixer 116 uses high side mixing to upconvert the lower band RF input signal 202 to a higher first intermediate frequency by mixing the input signal 202 with a first local oscillator signal 204. As the first local oscillator (LO1) signal 204 is varied through its 9 GHz to 15 GHz range, any incoming RF signal within the 0.1 to 6 GHz lower band (Band A) will mix with the LO1 signal 204 to produce a 9 GHz IF. For example, a 9.1 GHz LO1 frequency will convert a 0.1 GHz input signal to the 9 GHz IF. As another example, a 15 GHz LO1 will convert a 6 GHz RF input signal to the 9 GHz IF. As a result of the high side mixing, the spectrum of the 9 GHz IF signal will be inverted. The 9 GHz intermediate frequency 206 is then downconverted in the downstream mixer 136 by mixing the intermediate frequency with an second local oscillator (LO2) frequency 208 to produce the desired 1 GHz output. The mixer 136 uses low-side mixing by mixing the 9 GHz IF signal with an 8 GHz local oscillator frequency (LO2) 208 that is lower than the intermediate frequency. Due to the low side mixing, the output signal 210 remains inverted.

Figure 2B:
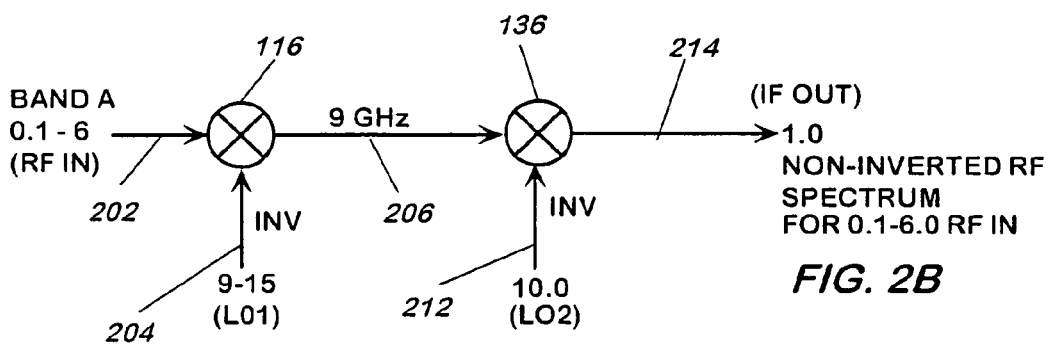

FIG. 2B illustrates a mixing profile for the 0.1 to 6 GHz input band that uses high side mixing in both mixers 116 and 136. The first mixing stage in FIG. 2B is the same as in FIG. 2A, but the second mixer 136 in FIG. 2B uses high side mixing by applying a 10 GHz local oscillator frequency. In both FIG. 2A and FIG. 2B, the 9 GHz intermediate frequency is inverted due to the high-side mixing. In FIG. 2B, the high-side mixing in mixer 136 re-inverts the inverted IF to produce a non-inverted 1 GHz output.

Spectrum inversion or non-inversion can therefore be selected by the operator by choosing either high side mixing or low side mixing for the second mixing stage. As will be discussed in later paragraphs, the receiver also produces an inverted 1 GHz output that Band B inputs in the 6–12 GHz range, and non-inverted outputs for Band B inputs above 12 GHz. Because low-side mixing in mixer 136 can result in mixer spurs in some parts of the filter's passband, the high side mixing plan in FIG. 2B is presently preferred. If non-inverted output signals are desired, the follow on electronics can typically convert the inverted signals to non-inverted signals.

Figure 2C:
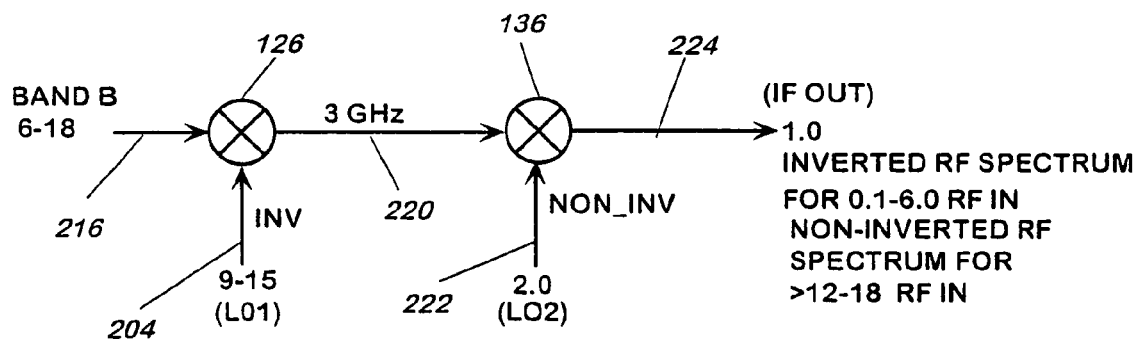
Figure 2D:
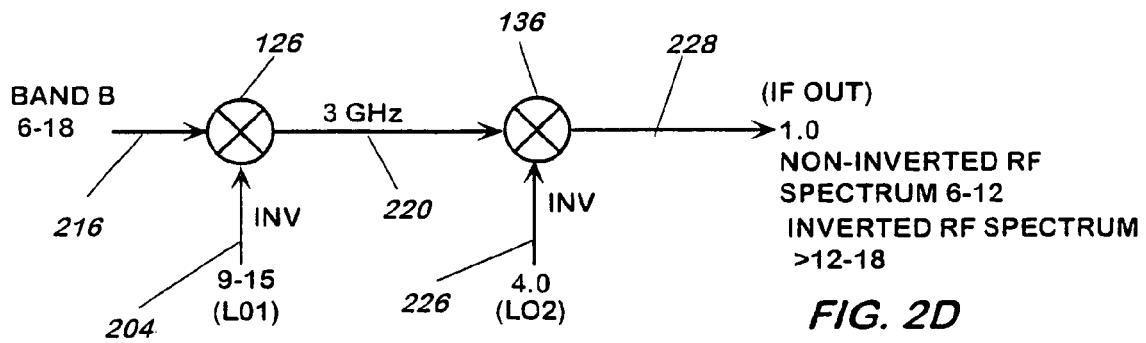

FIGS. 2C and 2D illustrate the mixing profile for input signals in the upper frequency band of 6–18 gigahertz (Band B). In both FIGS. 2C and 2D, in the first mixing stage, a local oscillator signal frequency of 9–15 GHz is mixed with the Band A (6–18 GHz) input to produce a 3 GHz intermediate frequency. Note that the range of input frequencies (6–18 GHz) that can be mixed to a 3 GHz intermediate frequency is twice as broad as the 9–15 GHz frequency range of the local oscillator signal. As the local oscillator frequency is scanned through its 9–15 GHz frequency range, it is mixed with a corresponding incoming signal in the 6–18 GHz band (Band B). The resulting 3 GHz intermediate frequency 220 will be inverted when the input frequency is less than 12 GHz, and will be non-inverted when the input frequency is greater than 12 GHz.

The next mixer 136 then converts the 3 GHz intermediate frequency to an output frequency of 1.0 GHz by either low side mixing (FIG. 2C) or high side mixing (FIG. 2D). In FIG. 2C, the second local oscillator frequency is 2.0 GHz non-inverted, and the resulting 1 GHz frequency is inverted when the input frequency is between 6 and 12 GHz, and non-inverted when the input frequency is between 12 and 18 GHz. In FIG. 2D, the second local oscillator frequency is 4.0 GHz, and the resulting 1 GHz output frequency is non-inverted when the input frequency is between 6 and 12 GHz and inverted when the input frequency is between 12 and 18 GHz.

One advantage of the receiver 100 described herein is that the mixing profile reduces images and other interfering frequencies that might be generated in the mixers. Some examples follow.

Mixers produce intermediate frequencies according to the equation IF=(N $f_R$)±(M $f_{LO}$), where N and M are integers, $f_R$ and $f_{LO}$ are the frequencies of the input signal and the local oscillator to be mixed, and IF is the resulting intermediate frequency. The largest amplitude signals result when both N and M are equal to 1, e.g., at IF=$2f_R$-$f_L$ and IF=$f_R$+$f_L$. Traditional mixers have specific image problems at the frequency $2f_L$-$f_R$ when up converting, and at $2f_R$ when downconverting. The mixing plan of the present receiver 100 eliminates these image problems. For example, when mixer 116 upconverts the a 6 GHz input signal to a 9 GHz IF (FIGS. 2A and 2B), the 2 $f_L$-$F_R$ result is IF=2(9)−1=18−1=17 GHz, which is far away from the intended 9 GHz IF and is well outside the bandwidth of the filter 118. Similarly, when the mixer 126 downconverts a 6.1 GHz input signal to 3 GHz (FIG. 2C and 2D), the 2 fL image is at 18 GHz, well away from the 3 GHz IF and well outside the bandwidth of the filter 132.

A few examples are provided to illustrate other advantages of the receiver's mixing plan. Referring again to mixer 116 in FIGS. 1 and 2A, when the first local oscillator 152 generates a frequency of 10 GHz, an RF input of either 1 or 19 GHz could produce the desired 9 GHz output. However, the Band A antenna range has an upper cut off below 19 GHz, and will not send a 19 GHz signal to mixer 116.

If the RF input to the mixer 116 is 1 GHz, a LO frequency of 8 GHz would also produce a 9 GHz intermediate frequency. However, the local oscillator 152 produces signals between 9 and 15 GHz, so a 8 GHz signal will not be generated.

With a 1 GHz RF input and a 10 GHz local oscillator signal, a 9.0 GHz and a 11 GHz signal can be produced (N=1 and M=1). However, the bandpass filter 118 that follows the mixer has a bandwidth that will allow the desired 9.0 GHz frequency to pass, but will reject a 11.0 GHz signal. For example, the bandpass filter 118 has a 9.0 GHz center frequency and a 275 MHz bandwidth, thus excluding signals with a frequency outside of the 8.86 to 9.14 GHz passband of the filter 118.

For a local oscillator frequency of 9.1 GHz (FIG. 2A), the possible RF inputs which will produce a 9 GHz output are 0.1 GHz and 19.1 GHz. However, the 19.1 GHz possible input is higher than the highest frequency of the input antenna, and will not reach the mixer, so only the 0.1 GHz input will reach the mixer. The 0.1 GHz input, when mixed with the 9.1 GHz local oscillator signal, can produce IF signals at 9.2 GHz and at 9.0 GHz. The 9.2 GHz signal, however, is outside of the 8.86 GHz to 9.14 GHz passband of the bandpass filter 118, and therefore will not pass through the filter. So only the 9.0 GHz intermediate frequency will be passed to the next mixing stage.

At the upper end of the Band A input range, when an RF input of 6.0 GHz is mixed with a 15 GHz LO1, two main signal components will be produced having frequencies of 9 GHz and 21 GHz. The 21 GHz frequency component is outside the passband of the filter 118 and will not pass through the filter 118. For the 15 GHz LO1, the possible inputs that will produce a 9 GHz IF include 6 GHz and 24 GHz. The 24 GHz input frequency is outside of the frequency of the Band B input band, so will not pass to the mixer.

In this arrangement, each local oscillator signal has only one RF input within the RF input band that will result in a large amplitude IF at the output of the following bandpass filter. Thus, as the local oscillator is tuned through its frequency range, when an IF signal is produced at the output of the mixer, the input frequency can be readily determined by its correspondence with the local oscillator frequency.

After filtering and amplification, the Band A 9 GHz intermediate frequency signal 206 is then downconverted in the mixer 136 by either low-side mixing with a 8 GHz local oscillator signal (LO2) or high side mixing with a 10 GHz local oscillator signal. The choice of high-side mixing or low-side mixing can be either made by the operator or preset into the controller for the LO2 source. The resulting output signal from the mixer 136 is passed through a second bandpass filter 142 with a bandwidth that includes, and preferably is centered on the desired output frequency. For example, the bandpass filter 142 in the FIG. 1 receiver has a bandwidth centered on 1.0 GHz with a bandwidth of 500 MHz, so it attenuates signals having a frequency less than 750 MHz and greater than 1.25 GHz. Thus, the bandpass filter will attenuate any other signals that are generated by mixing the 9 GHz signal that passes through the first bandpass filter with the LO2 frequency.

The receiver 100 shown in FIG. 1 has an overall gain of 20 dB, however, the receiver components can readily be modified to provide different amounts of gain, e.g., 40 dB, suitable for driving an analog to digital digitizer. The gain of the receiver can be adjusted by removing one of the cascaded gain blocks, or by changing the bias of the resistors associated with the gain blocks.

Figure 3:
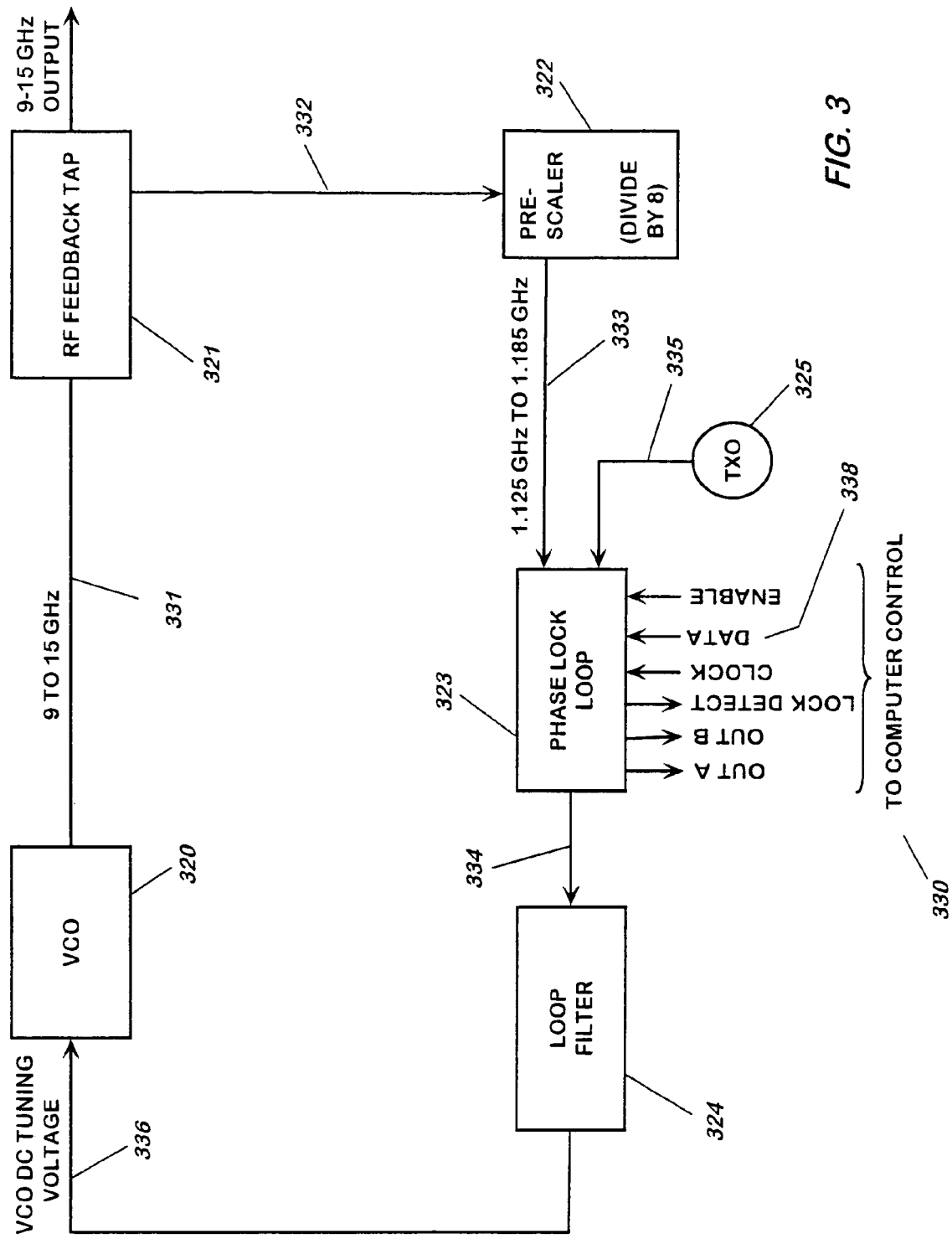
FIG. 3 illustrates a synthesizer suitable for use in the receivers of FIGS. 1, 4, 5, and 7.

FIG. 3 illustrates the components and operation of a synthesizer local oscillator 152 for producing the first local oscillator signal. As seen in FIG. 1, the local oscillator signal from the synthesizer 152 is outputted from the local oscillator module 150 and is switched between the Band A input mixer 116 and the Band B input mixer 126 by a 6 pin diode switch 134 or other suitable type of switch. The synthesizer 152 tunes from 9 to 15 GHz in selectable frequency step sizes. For example, the local oscillator 152 is a synthesizer with a tuning speed of 10 ms and selectable step sizes as small as 1 MHz, that can be selected by the operator or can be preset. As shown in FIG. 3, the local oscillator 152 includes a tuned voltage controlled oscillator (VCO) 320. A portion 332 of the VCO's output signal 331 is tapped off at an RF Feedback Tap 321 and sent to a frequency divider 321, which is a divide-by-eight pre-scalar that divides the 9–15 GHz frequency range to produce a signal 333 in a more useful 1.125 to 1.185 GHz range. The transformed frequency signal 333 is fed into a phase lock loop (PLL) frequency synthesizer 323. Within the PLL synthesizer 323, the input frequency 333 undergoes additional dividing iterations and is then compared to a reference frequency 335 generated by a temperature-compensated crystal oscillator 325 for reference. Pulsed phase information 334 from the PLL synthesizer 323 is passed to a loop filter 324 where it is filtered and upon lock provides a DC voltage 336 to the tuning port of the voltage controlled oscillator 320.

To change the synthesizer frequency, thus tuning the receiver, a serial synchronous data word 338 is sent into the data port of the PLL 323 by a controller 330 such as a personal computer or field programmable gate array (FPGA). These words 338 adjust the frequency dividers within the PLL 323 to step the frequency through the tuning range.

The components in the converter 110 and local oscillator 150 modules can be selected to have any desired degree of reliability. For example, using special reliability components for all the active devices can produce a receiver which is spacecraft-qualified.

Each module discussed in previous paragraphs can be housed within a an outer housing formed of metal or another suitable material. The housings can be affixed to each other in a compact receiver package approximately 2' by 2' by 3' in size, and weighing approximately 12 ounces. Power connections and inter-module connectors arranged at the ends of the housings. If desired, the receiver can be ruggedized by using rugged packaging of the receiver, in which the housing is slightly larger, and includes waterproofing seals, EM interference seals, and special sealed connectors.

Figure 4:
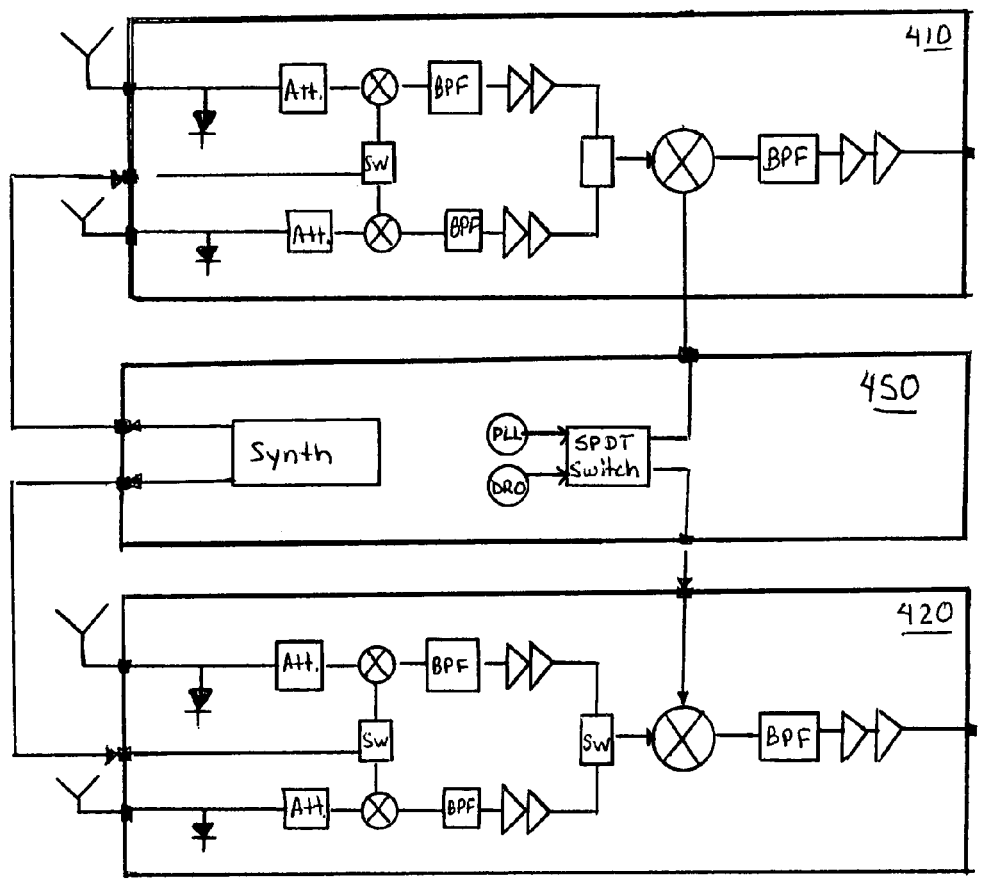
FIG. 4 is a schematic view of a dual-band, dual-channel receiver according to an embodiment of the invention.

While the receiver 100 is shown in FIG. 1 as being single channel with dual-band inputs (0.1–6 GHz and 6–18 GHz), and as having one converter module and one local oscillator module, a receiver can also be configured with two or more channels. For example, the FIG. 4 receiver 400 includes two or more converter modules and one local oscillator module. The converter modules 410 and 420 are each similar or identical to the converter module 110 of FIG. 1. Each of the converter modules 410 and 420 receives local oscillator signals from the local oscillator/synthesizer module 450. The signals provided at the outputs 408 and 428 of the two converter modules 410 and 420 can be used in a further signal processor for coherent processing. The local oscillator/synthesizer module 450 has outputs for each of the modules 410 and 420. Power combiners to supply both receivers can be located external to the converter modules 410 and 420 and the local oscillator module 450 or can be included in the local oscillator module 450 for compactness.

Figure 5:
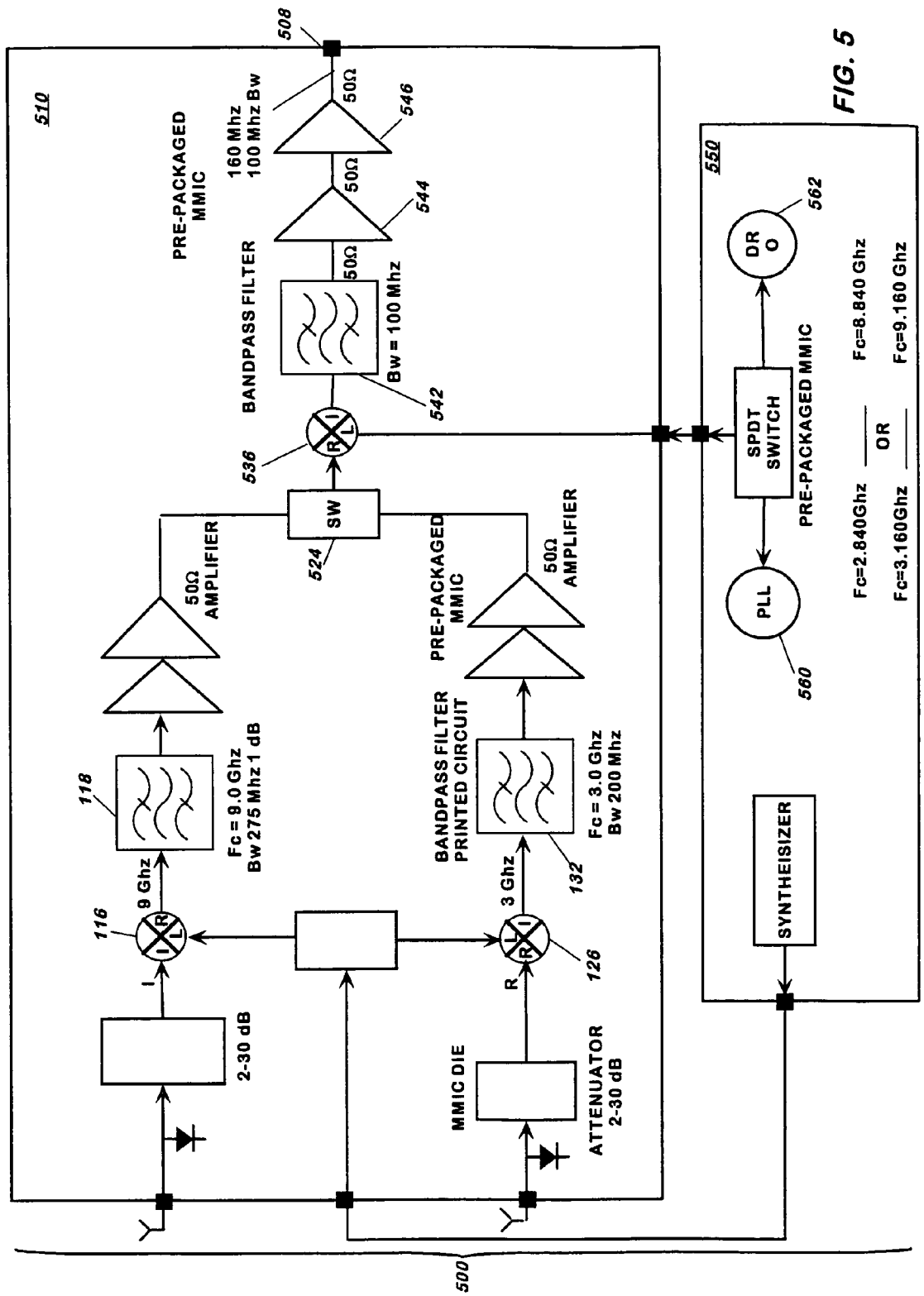
FIG. 5 is a schematic view of a receiver according to another embodiment of the invention.

FIG. 5 illustrates a second embodiment of a receiver 500 adapted to receive input signals in the 0.1–6 GHz Band A and the 6–18 GHz Band B, and to convert the input signals to an output frequency of 160 MHz. The receiver 500 operates similarly to the system in FIG. 1. The input components and the components for the first stage mixing, filtering, and amplification are generally the same as the receiver in FIG. 1.

For the second mixing stage of the receiver 500, the R port of the mixer 536 receives a 3 GHz signal or a 9 GHz signal from the switch 524. A local oscillator signal is provided to the L port of the mixer 536, to produce an output signal with a frequency of 160 MHz.

The local oscillator module 550 is identical to the FIG. 1 local oscillator module 150, with the exception that the source for the second local oscillator provides signals with different frequencies to the downstream mixer 536. For example, for converting the Band A 9 GHz intermediate frequency to a 160 MHz output, the phase locked loop synthesizer 560 produces either a 2.840 GHz or 3.160 GHz signal, depending on whether low side or high side mixing is desired. Similarly, for converting the Band B 3 GHz intermediate frequency, the DRO 562 produces either a 8.840 GHz signal or a 9.160 GHz signal, depending on whether low side or high side mixing is desired.

In addition, the bandpass filter 542 that follows the second stage mixer 536 preferably has a narrower passband than the filter 142 in the FIG. 1 receiver 100 in order to reject the image frequencies, which can be closer to the desired IF frequency. For example, the filter 542 has a 1 dB bandwidth of 100 MHz. The filter 542 therefore filters all signals below 110 MHz and above 210 MHz.

FIGS. 6A–6D illustrate the mixing profile for the receiver 500 of FIG. 5. For FIGS. 6A–6D, the profile for the first mixing stage is the same as shown in FIGS. 2A–2D. In the second mixing stage, and as seen in FIG. 2A, a 9 GHz intermediate frequency signal is fed into the R path of the second stage mixer, and a 8.840 GHz local oscillator signal is fed to the L port of the mixer 536. The mixer 536 can produce output signals with main components having frequencies of 17.840 GHz, well outside the passband of the filter 542, and 160 MHz, which is the center of the filter's 542 passband. So for an IF of 9 GHz and a local oscillator signal of 8.840 GHz entering the mixer 536, the receiver 100 will produce a main signal at 160 MHz.

Consider next possible image frequencies. For a local oscillator signal at 8.840 GHz, an input IF signal of 8.68 GHz could also result in an output signal having a 160 MHz frequency. However, as can be seen in FIG. 5, the suggested 8.68 GHz input signal is outside the passband of the first stage filter 118 and 132, so an 8.68 GHz input signal cannot reach the second stage mixer 536.

Figure 6A:
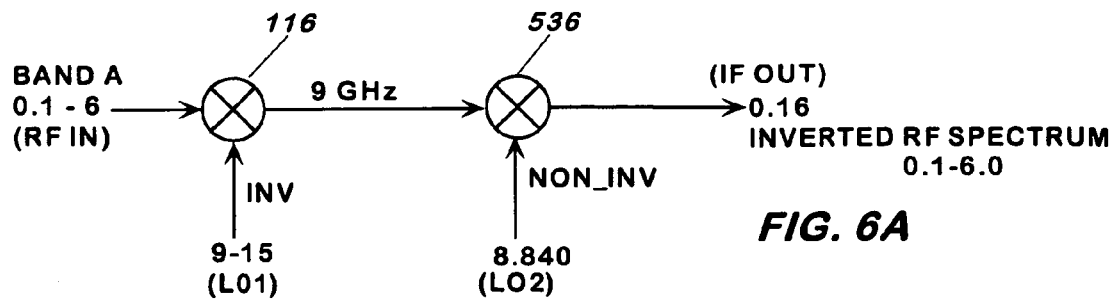
FIG. 6 illustrates a mixing profile for the receiver of FIG. 5.
Figure 6B:
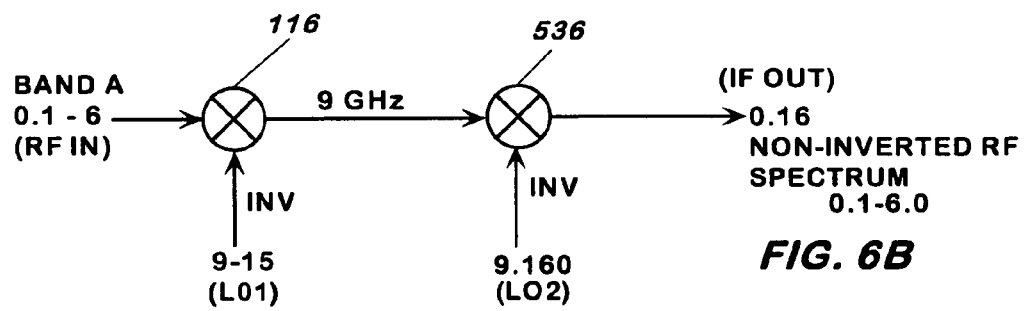

FIG. 6B illustrates a mixing path when high-side mixing is used in both mixing stages. In the second stage mixer 536, the local oscillator frequency is 9.160 GHz. The fL±fR results for a 9 GHz input signal are 18.16 GHz, which is well outside the filter 542 passband, and 160 MHz, which is the center of the filter passband. Therefore, for a 9 GHz input to the second mixing stage, the only output signal will have a frequency of 160 MHz. Consider that for a local oscillator frequency of 9.160 GHz, a 160 MHz output could also result from an intermediate frequency input of 9.320 GHz. However, the suggested 9.320 GHz intermediate frequency is outside the passband of the Band A and Band B bandpass filters 118 and 132, and therefore will not be passed to the mixer 536.

Figure 6C:
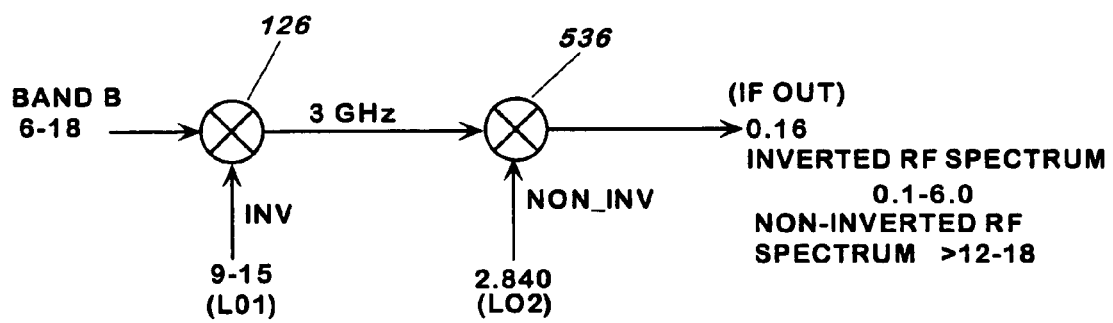

Consider next FIG. 6C, in which the Band B first stage mixer 126 produces a 3 GHz intermediate frequency signal. The mixer 536 receives the 3 GHz IF signal in the R port, and receives a 2.84 GHz local oscillator signal from the phase locked loop synthesizer 560. The fL±fR output will be 5.84 GHz and 160 MHz. Since the 5.84 GHz output signal is outside the 110 to 210 MHz passband of the filter 542, only the 160 MHz signal will pass through the gain blocks 544 and 546 to the module's output connector 508. Consider also that a 2.84 GHz LO signal could result in a 160 MHz output signal if the IF input to the mixer 536 were present at 2.68 GHz frequency. However, the suggested 2.68 GHz frequency is outside the passbands of the bandpass filters 118 and 132, and therefore, will not be forwarded to the mixer 536.

Figure 6D:
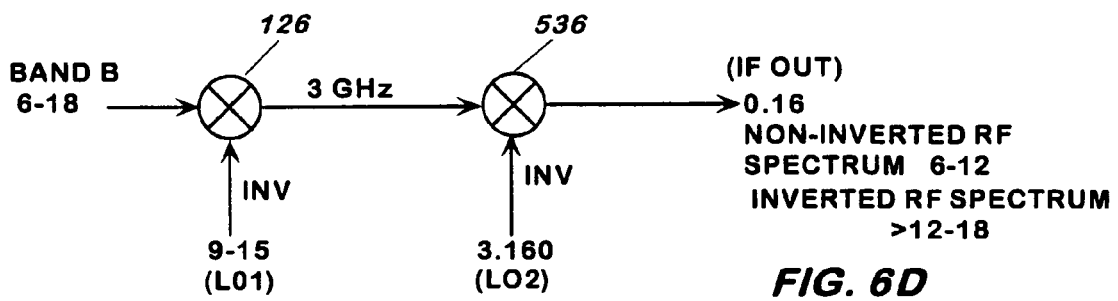

Turning next to FIG. 6D, the mixer 536 receives the 3 GHz IF signal in the R port, and receives a 3.160 GHz local oscillator signal from the phase locked loop synthesizer 560. For these inputs, the fL±fR outputs of the mixer will be 6.160 GHz and 160 MHz. Since the 6.160 GHz possible output frequency is outside the passband of the filter 542, only the desired 160 MHz output signal will reach the output connector 508 of the module 510. Consider that for the local oscillator frequency of 3.160 GHz, an IF input frequency of 3.320 GHz can produce a 160 MHz frequency output at the I port. However, the suggested 3.320 GHz intermediate frequency is outside the passband of the Band A and Band B bandpass filters 118 and 132, and therefore will not be passed to the mixer 536.

Note that for FIG. 6A, the spectrum of the output signal will be inverted for an input in the Band A frequency range of 0.1 to 6 GHz. However, the spectrum of the output signal for the Band A input is inverted when high side mixing is used in both stages (FIG. 2B). A PC or other computer (not shown) can readily non-invert the inverted signal, if desired. For Band B, the FIG. 2C mixing profile results in an inverted output spectrum for input frequencies of 6 to 12 GHz and a non-inverted output spectrum for input frequencies greater than 12 GHz through 18 GHz. The FIG. 2D mixing profile results in a non-inverted output spectrum for input frequencies of 6 to 12 GHz and an inverted output spectrum for input frequencies greater than 12 GHz through 18 GHz. The change in inversion at the 12 GHz breakpoint is due to the receiver configuration and the large first LO tuning.

The FIG. 5 receiver 500 operates on +24V, +15V, 5, and −5 V DC power. An alternative is to use a power source (not shown in the FI) that requires only +24 V and provides all the necessary voltages. Power consumption is approximately 7.35 Watts for Band A and 6.5 Watts for Band B. The phase noise is approximately −85 dBc/Hz at 1 MHz, and the noise figure of the receiver is 16 dB. The input intercept point is 8.6 dBm, and the tangential sensitivity is −75 dBm. The gain is 20 dB or 40 dB, and the dynamic range is 70 dB total. The input power level can be up to +20 dBm for CW, and +47 dBm for pulse energy (1 µs pw, 0.1% duty cycle). The size of the receiver 500, including the module housings, is approximately 2'×2'×3', and the weight is approximately 20 ounces.

The mixers 116 and 126 of the FIG. 5 receiver 100 mix the input signal so that any image or interfering frequencies are well away from the desired IF output and well outside the bandwidth of the following filters 118 and 132, in the manner described above for the FIG. 1 receiver.

Spectrum inversion can be compensated by program software if desired. For example, a computer can re-invert the inverted signal after digitization of the output frequency. In some applications, non-inversion is desired to provide quick inter-changeability with other receivers without having concern on toggling the computer. Simple internal module replacement by the manufacturer is possible to select either inversion or non-inversion choices.

Figure 7:
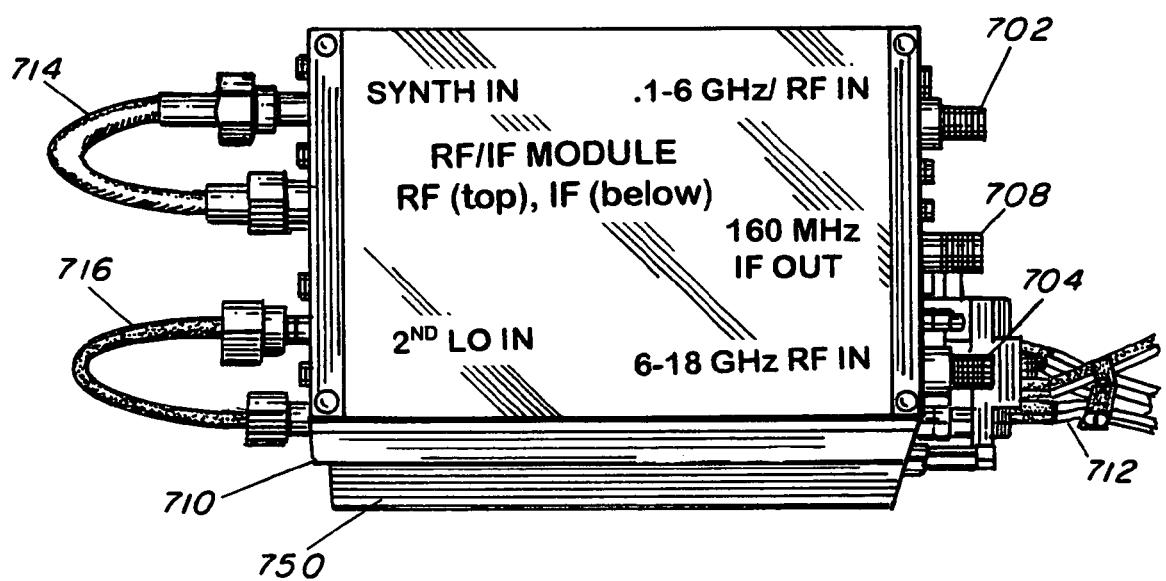
FIG. 7 illustrates an operational modular receiver similar to the FIG. 5 receiver.

FIG. 7 illustrates an operational receiver having the features of the FIG. 5 embodiment. Two adjacent housings 710 and 750 contain the converter module and the local oscillator module, respectively. Input connectors 702 and 704 are provided at one end of the housing 710 for receiving the 0.1–6 GHz and the 6–18 GHz RF inputs respectively. An output connector 708 is arranged at the end of the housing 710 to output the converted signal. Power and control signals are provided to the housing 750 through cabling 712. At the other end of the housing, connections 714 and 716 are provided between the local oscillator module and the converter module to transmit the local oscillator signals to the converter module.

The invention has been described with reference to certain preferred embodiments thereof. It will be understood, however, that modification and variations are possible within the scope of the appended claims.

What is claimed is:

1. A superheterodyne receiver suitable for receiving RF energy in an upper frequency band and a lower frequency band and for translating the received RF energy to an output frequency, the receiver comprising:
   at least one attenuator for attenuating the received RF energy;
   a first mixer arranged for mixing the RF energy in the lower frequency band with a first local oscillator signal to produce a signal at a first intermediate frequency;
   a second mixer arranged for mixing the RF energy in the upper frequency band with the first local oscillator signal to produce a signal at a second intermediate frequency;
   a switch arranged to direct the first local oscillator signal to the first mixer or to the second mixer; and
   a third mixer for mixing a second local oscillator signal with the signal at the first intermediate frequency or with the signal at the second intermediate frequency to produce a signal at the output frequency.

2. The superheterodyne receiver according to claim 1, wherein the at least one attenuator includes a first attenuator coupled to an input of the first mixer to attenuate the RF energy in the lower frequency band, and a second attenuator coupled to an input of the second mixer to attenuate the RF energy in the upper frequency band.

3. The superheterodyne receiver according to claim 2, further comprising:
   a first RF limiter coupled to the first attenuator for limiting the amplitude of the RF energy in the lower frequency band; and
   a second RF limiter for limiting the amplitude of the RF energy in the upper frequency band.

4. The superheterodyne receiver according to claim 2, wherein at least the first attenuator is tunable.

5. The superheterodyne receiver according to claim 2, the first attenuator being a tunable 30 dB attenuator.

6. The superheterodyne receiver according to claim 2, at least the first attenuator being a MMIC component.

7. The superheterodyne receiver according to claim 1, further comprising:
   a first input arranged for receiving RF energy in the lower band and transferring the RF energy to the first mixer; and
   a second input arranged for receiving the RF energy in the upper band and transferring the RF energy to the second mixer.

8. The superheterodyne receiver according to claim 1, further comprising:
   at least one gain block arranged for amplifying the signal at the first intermediate frequency; and
   at least another gain block arranged for amplifying the signal at the second intermediate frequency.

9. The superheterodyne receiver according to claim 8, wherein the gain blocks are MMIC components.

10. The superheterodyne receiver according to claim 1, further comprising:
    a first bandpass filter arranged to receive and filter an output of the first mixer, the first bandpass filter having a bandwidth encompassing the first intermediate frequency; and
    a second bandpass filter arranged to receiver and filter an output of the second mixer, the second bandpass filter having a bandwidth encompassing the second intermediate frequency.

11. The superheterodyne receiver according to claim 10, the first bandpass filter having a bandwidth excluding other signals generated in the first mixer, the second bandpass filter having a bandwidth excluding other signals generated in the second mixer.

12. The superheterodyne receiver according to claim 10, further comprising:
    a third bandpass filter arranged to receiver and filter an output of the third mixer, the third bandpass filter having a bandwidth encompassing the output frequency.

13. The superheterodyne receiver according to claim 12, the first, second, and third bandpass filters being printed bandpass filters.

14. The superheterodyne receiver according to claim 1, wherein the first mixer, the second mixer, and the third mixer are drop-in components.

15. The superheterodyne receiver according to claim 1, wherein
    the receiver has no filter and no amplifier between the input and the first mixer, and
    wherein the receiver has no filter and no amplifier between the input and the second mixer.

16. The superheterodyne receiver according to claim 1, further comprising:
    a first local oscillator for producing the first local oscillator signal; and
    a tuner for tuning the first local oscillator signal through a range of frequencies.

17. The superheterodyne receiver according to claim 1, further comprising:
    at least one of a dielectric resonance oscillator and a phase locked loop synthesizer for producing the second local oscillator signal.

18. The superheterodyne receiver according to claim 1, further comprising:
    a dielectric resonance oscillator;
    a phase locked loop synthesizer; and
    a switch arranged for directing a second local oscillator signal from the dielectric resonance oscillator or the phase locked loop synthesizer to the third mixer.

19. The superheterodyne receiver according to claim 18, wherein the switch is a MMIC component.

20. The superheterodyne receiver according to claim 1, wherein the first intermediate frequency is greater than an upper limit of the lower frequency band, and the second intermediate frequency is lower than a lower limit of the upper frequency band.

21. The superheterodyne receiver according to claim 20, wherein output frequency is less than the first intermediate frequency and the second intermediate frequency.

22. The superheterodyne receiver according to claim 1, wherein the output frequency is within the lower frequency band.

23. The superheterodyne receiver according to claim 1, wherein the first intermediate frequency is about 9 gigahertz and the second intermediate frequency is about 3 gigahertz.

24. The superheterodyne receiver according to claim 23, wherein the output frequency is about 1 gigahertz.

25. The superheterodyne receiver according to claim 23, wherein the output frequency is about 160 megahertz.

26. The superheterodyne receiver according to claim 1, wherein the lower frequency band is about 100 megahertz to about 6 gigahertz, the upper frequency band is about 6 gigahertz to about 18 gigahertz, the first local oscillator frequency is between about 9 gigahertz and about 15 gigahertz, and the first intermediate frequency is about 9 gigahertz.

27. The superheterodyne receiver according to claim 1, the receiver having at least 30 dB instantaneous dynamic range and at least 60 dB total dynamic range.

28. The superheterodyne receiver according to claim 1, further comprising:

a power source.

29. The superheterodyne receiver according to claim 1, further comprising:

a first module having a housing, an output for the output signal, at least one input for the received RF energy, at least one input for the first and second local oscillator signals, the first mixer, the second mixer, the third mixer, the switch, and the at least one attenuator;

a second module having at least one source for the first and second local oscillator signals within a second housing, and at least one output for the first and second local oscillator signals; and a signal path between the first and second modules for transmitting the first and second local oscillator signals to the first module.

30. The superheterodyne receiver according to claim 1, the second intermediate frequency being different than the first intermediate frequency.

31. The superheterodyne receiver according to claim 30, the second intermediate frequency being three times larger than the first intermediate frequency.

32. The superheterodyne receiver according to claim 1, wherein the first oscillator signal is tunable over a range greater than the combined lower frequency band and the upper frequency band.

33. The superheterodyne receiver according to claim 1, wherein the local oscillator signal is tunable to a frequency lower than the lower frequency band and to a frequency greater than the upper frequency band.

34. The superheterodyne receiver according to claim 1, further comprising:

a controller for varying the local oscillator signal over a range that provides high side mixing and low side mixing between the first local oscillator signal and the received RF energy in the lower band and provides high side and low side mixing between the first local oscillator signal and the received RF energy in the upper band.

35. A scanning superheterodyne receiver suitable for receiving RF energy in an upper frequency band and a lower frequency band and for translating the received RF energy to an output frequency, the receiver comprising:

at least one input for receiving the RF energy;

at least one attenuator for attenuating the received RF energy;

a first mixer arranged for mixing a first local oscillator signal with the RF energy in the lower frequency band to produce a signal at a first intermediate frequency;

a second mixer arranged for mixing the first local oscillator signal with the RF energy in the upper frequency band to produce a signal at a second intermediate frequency;

a switch configured to direct the first local oscillator signal either to the first mixer or to the second mixer;

a third mixer for mixing a second local oscillator signal with the signal at the first intermediate frequency or the signal at the second intermediate frequency to produce a signal at the output frequency; and a tuner for tuning the first local oscillator signals through a range of frequencies.

36. A superheterodyne receiver suitable for receiving RF energy in a lower frequency band and an upper frequency band above the lower frequency band, the receiver comprising:

a source for a first local oscillator signal, the first local oscillator signal having a range of frequencies within the upper frequency band;

at least one input for receiving the RF energy;

a first mixer arranged for mixing the RF energy in the lower frequency band with the first local oscillator signal to produce a signal at a first intermediate frequency;

at least one filter arranged to bandpass filter the signal produced by the first mixer, the first mixer folding any interfering frequencies produced by the first mixer outside the bandwidth of the filter;

a second mixer arranged for mixing the RF energy in the upper frequency band with the first local oscillator signal to produce a signal at a second intermediate frequency;

a switch arranged to direct the first local oscillator signal either to the first mixer or to the second mixer;

at least one filter arranged to bandpass filter the signal produced by the second mixer, the second mixer folding any interfering frequencies produced by the second mixer outside the bandwidth of the filter;

a third mixer for mixing a second local oscillator signal with the signal at the first intermediate frequency or with the signal at the second intermediate frequency to produce a signal at the output frequency, the output frequency being lower than the first and the second intermediate frequencies; and at least one output for outputting the output signal.

37. A method for receiving RF energy and translating the RF energy to a predetermined output frequency in a superheterodyne receiver, the receiver having a first mixer for mixing the received RF energy in a lower band with a first local oscillator signal, a second mixer for mixing the received RF energy in an upper band with the first local oscillator signal, and a switch arranged to direct the first local oscillator signal to the first mixer or to the second mixer, the method comprising:

switching the local oscillator signal either to the first mixer or to the second mixer, mixing the first local oscillator signal and the received RF energy in the lower band to produce a signal at a first intermediate frequency above the frequency of the received RF energy in the lower band and the frequency of the first local oscillator signal, or mixing the first local oscillator signal with the received RF energy in the upper band to produce a signal at a second intermediate frequency, the second intermediate frequency being lower than the frequency of the received RF energy in the upper band and the frequency of the first local oscillator signal, and mixing a third local oscillator signal with the signal at the first intermediate frequency or with the signal at the second intermediate frequency to produce an output signal at the output frequency, the output frequency being lower than the respective first or second intermediate frequency.

38. The method according to claim 37, further comprising:
 passing the first intermediate signal through at least one filter having a bandwidth encompassing the first intermediate frequency,
 wherein the mixing of the first local oscillator signal with the incoming RF energy in the upper or lower band folds interfering frequencies outside the bandwidth of the filter.

39. The method according to claim 37, without any pre-selection filtering of the received RF energy.

40. The method according to claim 37, further comprising:
 passing the second intermediate signal through at least one filter having a bandwidth encompassing the second intermediate frequency,
 wherein the mixing of the first local oscillator signal with the incoming RF energy folds any interfering frequencies in the mixer outside the bandwidth of the filter.

41. The method according to claim 37, further comprising:
 varying the first local oscillator signal through a range of frequencies.

42. The method according to claim 37, wherein the second local oscillator frequency is less than the first intermediate frequency, and the output resulting from received RF energy in the lower band is inverted.

43. The method according to claim 37, wherein the second local oscillator frequency is higher than the first intermediate frequency, and the output resulting from received RF energy in the lower band is non-inverted.

44. The method according to claim 43, wherein the range of frequencies of the first local oscillator signal is about twice as large as the upper frequency band, wherein the output resulting from received RF energy having a frequency in a lower half of the upper frequency band is inverted, and wherein the output signal resulting from received RF energy having a frequency in an upper half of the upper frequency band is non-inverted.

45. The method according to claim 43, wherein the output signal resulting from received RF energy in the upper band is non-inverted.

46. The method according to claim 37, wherein the second local oscillator frequency is less than the first intermediate frequency.

47. The method according to claim 46, wherein the output resulting from received RF energy in the upper frequency band is inverted.

48. The method according to claim 37, wherein the second local oscillator frequency is greater than the first intermediate frequency.

49. The method according to claim 48, wherein the output signal resulting from received RF energy in the lower band is inverted when the received RF energy is in an upper portion of the upper frequency band.

50. The method according to claim 48, wherein the output signal resulting from received RF energy in the lower band is non-inverted when the received RF energy is in a lower portion of the upper frequency band.

51. The method according to claim 48, wherein the range of frequencies of the first local oscillator signal is about twice as large as the upper frequency band, wherein the output resulting from received RF energy having a frequency in a lower half of the upper frequency band is non-inverted, and wherein the output resulting from received RF energy having a frequency in an upper half of the upper frequency band is inverted.

52. The method according to claim 37, wherein the lower frequency band is about 100 megahertz to about 6 gigahertz, and the upper frequency band is about 6 gigahertz to about 18 gigahertz.

53. The method according to claim 37, wherein the first intermediate frequency is about 9 gigahertz, and the second intermediate frequency is about 3 gigahertz.

54. The method according to claim 37, wherein the output frequency is about 1 gigahertz.

55. The method according to claim 37, wherein the output frequency is about 160 megahertz.

56. A superheterodyne receiver suitable receiving RF energy in an upper frequency band and a lower frequency band and for translating the received RF energy to an output frequency, the receiver comprising:
 a local oscillator module having at least one local oscillator source;
 at least two converter modules for converting the received RF energy to the output frequency; and
 at least one connection between the local oscillator module and the converter modules to transmit the local oscillator signals to the converter modules,
 each of the converter modules having
  a first mixer arranged for mixing the RF energy in the lower frequency band with a first local oscillator signal from the local oscillator module to produce a signal at a first intermediate frequency,
  a second mixer arranged for mixing the RF energy in the upper frequency band with the first local oscillator signal from the local oscillator module to produce a signal at a second intermediate frequency,
  a third mixer for mixing a second local oscillator signal from the local oscillator module with the signal at the first intermediate frequency or with the signal at the second intermediate frequency to produce a signal at the output frequency, and
  a switch arranged to direct the first local oscillator signal either to the first mixer or to the second mixer.

57. The receiver according to claim 56, each of the converter modules having an attenuator arranged to attenuate the received RF energy and to input the attenuated RF energy to the first mixer or the second mixer.

58. The superheterodyne receiver according to claim 56, wherein the converter modules produce identical output signals suitable for coherent processing of the output signals.

* * * * *